J. C. LOCKYER & J. P. FRANK.
CONTROLLING MEANS FOR TRANSMISSION MECHANISM.
APPLICATION FILED APR. 8, 1912.
1,043,445.
Patented Nov. 5, 1912
3 SHEETS—SHEET 1.
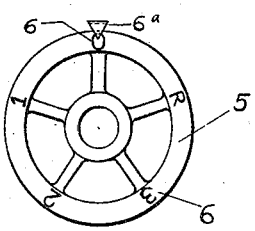
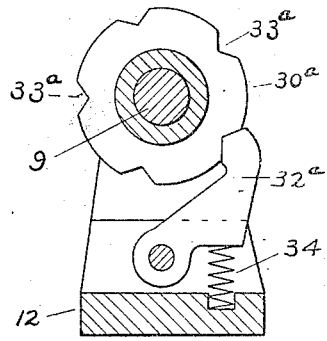
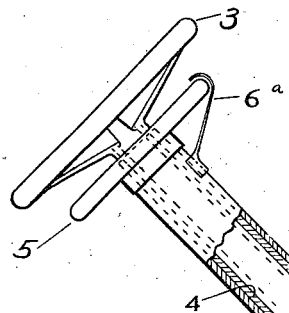
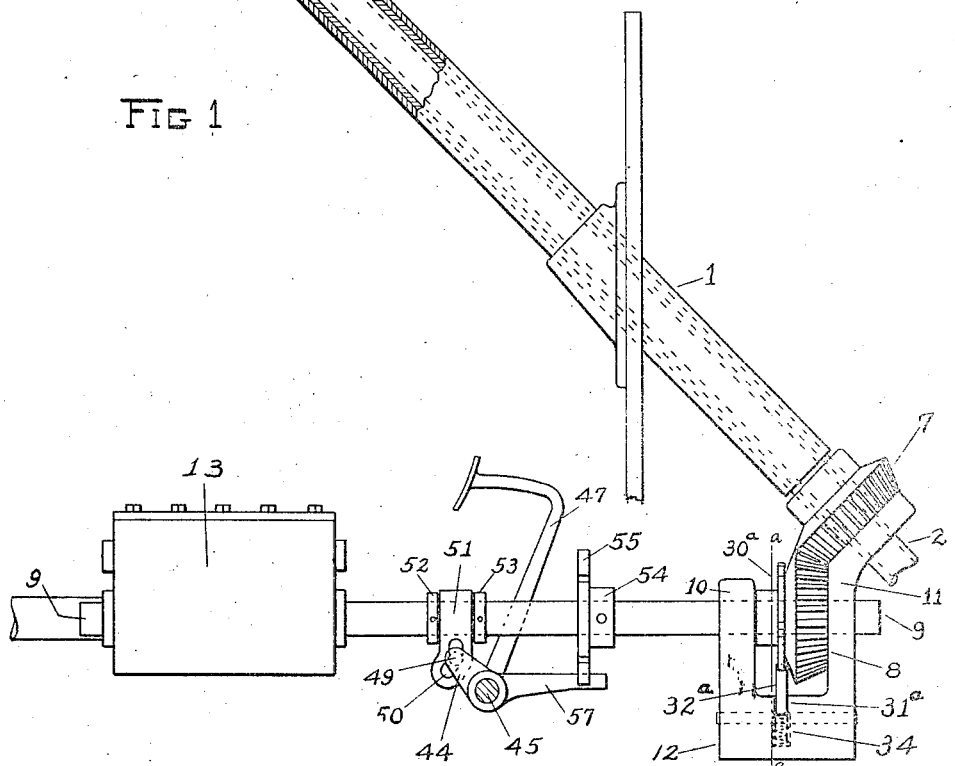
WITNESSES:
C. A. Guion.
George H. Snyder.
INVENTORS
John C. Lockyer and John P. Frank
BY
Howard P. Smith,
Their ATTORNEY J. C. LOCKYER & J. P. FRANK.
CONTROLLING MEANS FOR TRANSMISSION MECHANISM.
APPLICATION FILED APR. 8, 1912.
1,043,445.
Patented Nov. 5, 1912.
3 SHEETS—SHEET 2.
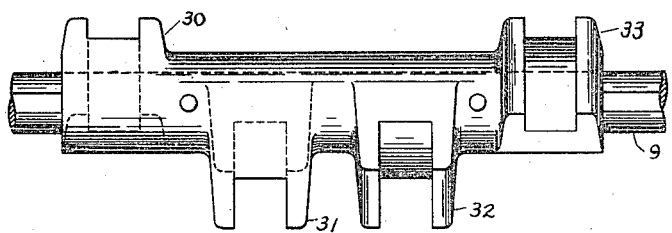
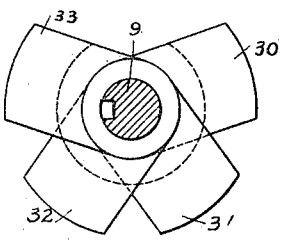
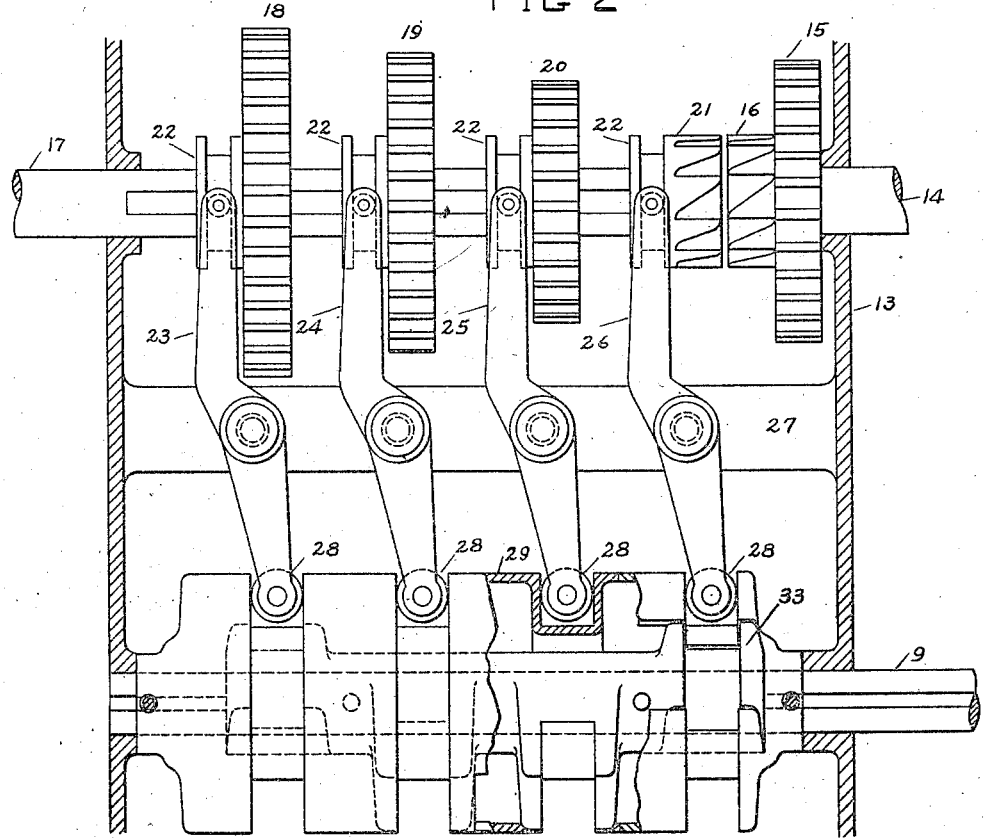

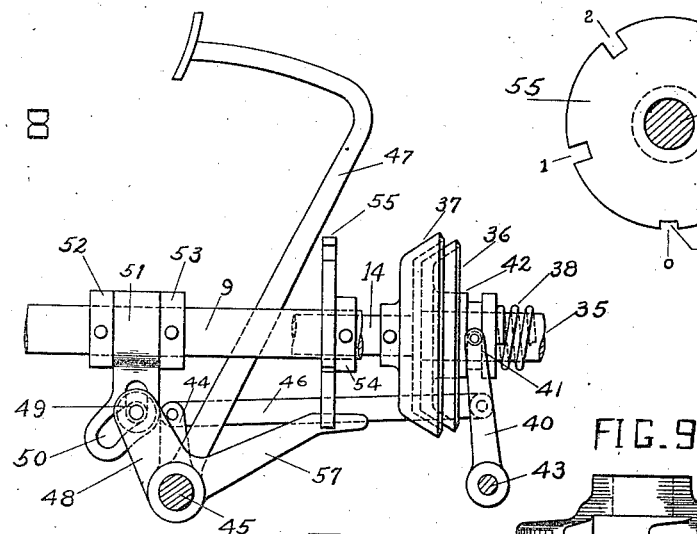
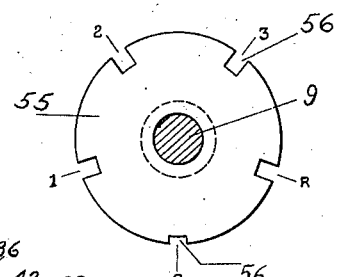
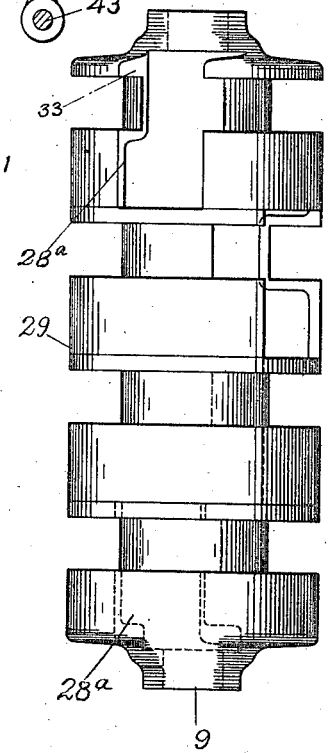
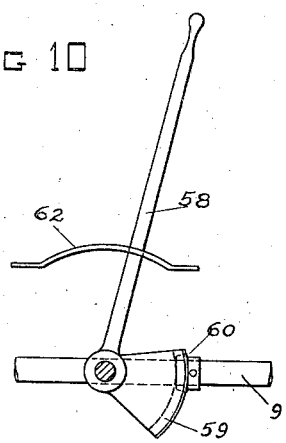
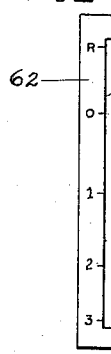

UNITED STATES PATENT OFFICE.

JOHN C. LOCKYER AND JOHN P. FRANK, OF DAYTON, OHIO.

CONTROLLING MEANS FOR TRANSMISSION MECHANISM.

1,043,445.   Specification of Letters Patent.   Patented Nov. 5, 1912.

Application filed April 8, 1912. Serial No. 689,105.

*To all whom it may concern:*

Be it known that we, JOHN C. LOCKYER and JOHN P. FRANK, citizens of the United States, residing at Dayton, in the county of Montgomery and State of Ohio, have invented certain new and useful Improvements in Controlling Means for Transmission Mechanism, of which the following is a specification.

This invention relates to new and useful improvements in controlling means for transmission mechanism.

The object of our invention is to provide means mounted on the steering post of an automobile, for selecting the different speed gears thereof, and a device controlled by the foot of the driver for throwing into engagement the gears which have been thus selected, as well as the driving clutch. By so controlling the selection of the different speed gears from the steering post of an automobile, the side lever commonly employed for this purpose is abandoned, thereby permitting the driver or any other person to readily enter the front of the car from either side thereof. It also centralizes the different elements of control, by bringing together in a position immediately in front of the driver the steering wheel, the selective mechanism, the spark control and the throttle.

A further object of our invention is to provide a construction which will hold the clutch out of engagement until the selected gears are engaged, and prevent the disengagement of the said gears before the clutch is disengaged.

With these and other incidental objects in view, our invention consists in the certain novel arrangement and construction of parts hereinafter described in the following specification and particularly pointed out in the subjoined claims.

In the accompanying drawings, Figure 1 is a side view of our invention, in section and partly broken away. Fig. 2 is a top plan view of sufficient of the transmission gearing to illustrate the application of our controlling mechanism thereto. Fig. 3 is a detail view of the shaft upon which are arranged the fingers for selecting the different speed gears. Fig. 4 is an end view of the same. Fig. 5 is a top plan view of the selective wheel carried by the steering post. Fig. 6 is a section on the line $a$—$a$ of Fig. 1, showing the notched disk and pawl used as a locating medium for the selective wheel. Fig. 7 is a top plan view of the notched disk for locking the selective mechanism in any of its different positions. Fig. 8 is a detail view of the foot-controlled device for imparting longitudinal movement to the selective-finger shaft and driving clutch. Fig. 9 is a longitudinal section of the housing for the selective fingers, showing one of the longitudinal slots in which said fingers are movable. Fig. 10 is a side view of a modified form of our transmission-mechanism selective means, and Fig. 11 is a top plan view of the curved plate containing the guide slot in which the lever shown in Fig. 10 is movable.

Throughout the specification and drawings, like reference characters denote corresponding parts.

In a detailed description of our invention, 1 designates a steering post or column which is secured to the body of an automobile in any suitable manner. Journaled within the post 1, which is preferably of inclined tubular form, is a tubular shaft 2 upon the upper end of which is mounted a steering wheel 3. Rotatably mounted upon the tubular shaft 2 is a sleeve 4 to the upper end of which is attached a circular wheel 5 divided by mark or letter into divisions 6 corresponding to the neutral, reverse, and forward speed positions of the transmission gearing. While any number of divisions may be provided on the circular wheel 5, we have shown five, viz., neutral, reverse, and three forward speed positions. Attached to the upper portion of the steering post 1 is a finder $6^a$, preferably of hook shape, for use in connection with the selective wheel 5. This wheel may be moved continuously in either direction to bring a certain designation thereon opposite the finder $6^a$, which movement is made possible through mechanism hereinafter to be described. Carried by the other end of the sleeve 4 is a bevel gear 7 which meshes with a similar gear 8 keyed to a transverse shaft 9 which is journaled at its forward end in suitable bearings secured in vertically disposed arms 10 and 11 of a bracket 12 attached to the frame of the automobile. The rear portion of the shaft 9 is journaled in a transmission housing 13, in which is also journaled, in longitudinal alinement with said shaft, a main driving shaft 14 carrying a gear 15 and a clutch member 16. Journaled in the transmission housing 13 in line with the driving shaft 14, is a transmission shaft 17 to which is keyed for axial movement thereon, gears 18, 19 and 20 and a clutch member 21. When the clutch member 21 is shifted into engagement with the clutch member 16, the driving shaft 14 is thereby coupled directly to the transmission shaft 17 and the automobile driven at its greatest speed. When the said clutch members are disengaged, motion is transmitted through the gear 15 to a pinion fast on a countershaft (not shown) and through other pinions fast thereon to any one of the selected gears 18, 19 or 20, and through them to the transmission shaft 17 to which they are keyed. As the transmission mechanism itself may be any one of the common types and forms no part of our invention, a further description of the same is deemed unnecessary. Each of the gears 18, 19 and 20, and the clutch member 21, is provided with a hub 22 having a grooved periphery. Engaging the grooved hubs 22 of the gears 18, 19 and 20 and the clutch member 21, are shifting levers 23, 24, 25 and 26 respectively, each of which being fulcrumed near its middle portion to a transverse member 27 supported by the housing 13. Each of the levers 23, 24, 25 and 26 carries at its lower end a roller 28, said rollers being in all respects similar. Each roller 28 normally rests in an annular groove formed in a cylindrical housing 29 keyed to the shaft 9, but having no longitudinal movement with the shaft. Mounted within the housing 29, and keyed to the shaft 9 for axial movement thereon, are sets of selecting fingers, 30, 31, 32 and 33. These sets correspond in number to the shifting levers 23, 24, 25 and 26, and are arranged spirally on the shaft 9, as will be seen by referring to Figs. 2 and 4. Each set comprises two upwardly projecting fingers so arranged and spaced apart that the opening between them will register with any one of the annular grooves in which the rollers 28 normally rest. Therefore, when a set of fingers 30, for example, is rotated sufficiently by the shaft 9, the fingers of that set will grip between them the roller 28 of the corresponding lever 23; and when the shaft is moved longitudinally, said fingers and roller will be likewise moved through a slot 28ª in the housing 29, which remains stationary, to shift the lever 23 and its corresponding gear 18, see Figs. 2 and 9. When the fingers 30 engage the roller 28, all the other fingers are out of engagement with their corresponding rollers, said rollers being locked in their normal positions by the annular grooves in which they rest. Therefore the housing 29 forms a locking means for the gear-shifting levers so that they are inoperative except when engaged by the selective fingers. When the fingers 30, and the roller 28 carried by the lever 23, are disengaged by rotating the shaft 9, any other set of fingers and its corresponding roller may be engaged through a further rotation of the shaft 9 by means of the circular wheel 5.

For the purpose of serving as a locating or guiding medium for the driver in turning the circular wheel 5 to a desired position, a notched disk 30ª is fixed to the bevel gear 8. Pivoted in a guide slot 31ª provided in the bracket 12, is a pawl 32ª, which, as said disk is rotated, will engage any one of the notches 33ª thereon, by reason of the upward pressure exerted against said pawl by a spring 34 mounted in the said guide slot. Each of the notches 33ª corresponds to a position in which one of the rollers 28 will be engaged by a certain set of selecting fingers, and a position in which none of the fingers and rollers will engage, or a neutral position when no motion will be transmitted from the driving to the transmission shaft. As we have shown a neutral, reverse and three forward speed positions, there will be five notches on the circular disk 30ª. As each of the notches 33ª has a corresponding indication 6 on the circular wheel 5, the engagement of the pawl 32ª with any one of the said notches will indicate to the driver the point at which the neutral, reverse or forward speed position desired has been selected. (See Figs. 1 and 6).

Referring to Fig. 8, 35 designates a power shaft to which is keyed a cup-shaped clutch member 36 adapted to engage a similar member 37 fast on the shaft 14, for the purpose of driving said shaft. The clutch member 36 is normally held in engagement with the clutch member 37 by a spring 38, and is disengaged therefrom by an arm 40 carrying a roller 41 which rests in an annular groove formed in the periphery of the hub 42 of the said clutch member 36. The said arm 40 is mounted on a shaft 43 suitably journaled in the frame of the automobile, and is connected to an arm 44 fast on a clutch-pedal shaft 45 by a link 46. While we have shown a driving clutch of the cone type, any one of the other forms of clutches commonly used in automobiles may be employed.

The clutch-pedal shaft 45 is journaled for rotation in suitable bearings secured to the main frame of the car, and has attached thereto a foot pedal 47. Mounted on the said shaft 45 is an arm 48 carrying a roller 49 which moves in a slot 50 of a cam arm 51 loosely mounted on the shaft 9 and lying between two collars 52 and 53 fast on said shaft. The upper portion of the slot 50 is vertical, and the lower portion is radial with the shaft 45. As before stated, the clutch-pedal shaft is connected to the clutch member 36 by the arm 44, link 46 and arm 40; and when the clutch members 36 and 37 are in engagement, the roller 49 rests in the bottom of the radial portion of the slot 50. As pressure is applied to the foot-pedal 47 and the clutch members 36 and 37 are disengaged, the roller 49 will move through the radial portion of the slot 50 without imparting any motion to the cam arm 51, until said roller enters the vertical portion of the slot 50 when a further downward movement of the foot-pedal 47 will cause said roller to move the cam arm 51 longitudinally. This movement will be imparted to the shaft 9 to disengage the gears which may have been previously selected by the circular wheel 5. It will thus be seen that the clutch members 36 and 37 must be first disengaged before the selected gears can be shifted, thus making stripping of the gears impossible. When another gear is selected by the selecting mechanism hereinbefore described, pressure on the foot-pedal 47 is released. The expanding clutch spring 38 will now exert its pressure to rock the shaft 45 in a reverse direction, through the arm 40, link 46 and arm 44, whereupon the arm 48 will move downwardly and the roller 49 carried thereby will impart a reverse longitudinal movement to the shaft 9 until said roller enters the radial portion of the slot 50. The arm 48 will continue in its downward movement until the engagement of the clutch members 36 and 37 is complete, but no further longitudinal movement will be imparted to the shaft 9 since the roller 49 moves the rest of the distance through the radial portion of the slot 50. This slot and roller construction therefore makes it impossible for the clutch members to engage before the gears are shifted.

Carried by a collar 54 mounted on the shaft 9 in front of the clutch pedal shaft 45, is a circular disk 55 having notches 56 formed in its outer periphery. Adapted to engage these notches 56 is an arm 57 mounted on the clutch-pedal shaft 45. These notches correspond to the notches on the disk 30ᵃ and the divisions on the circular wheel 5. Accordingly, when the shaft 9 is rotated by the circular wheel 5 to select a certain gear in the transmission, the disk 55 will be rotated to bring into a position to be engaged by the arm 57, the notch of the disk 55 which corresponds to the selected gear. The gear and clutch-shifting mechanism will therefore be locked until the arm 57 is disengaged from the said notch by the foot pedal 47. All of the notches 56 corresponding to the reverse and three forward speed positions, are deep enough to permit a slight disengagement of the clutch members 36 and 37 when rounding a curve or suddenly slowing up, without the necessity of shifting the gears. The notch on the disk 55 corresponding to the neutral position is of sufficient depth to lock the circular wheel 5, but not of sufficient depth to permit the engagement of the driving clutch, see Fig. 7.

Instead of employing a circular wheel mounted on the steering post, for selecting the different gears desired, a lever 58 may be used, which should be pivoted to the frame of the automobile at a point where a toothed sector 59 carried thereby may engage a bevel gear 60 mounted on the shaft 9, see Figs. 10 and 11. This lever 58 is adapted to be moved through a radial slot 61 formed in a circumferential guide plate 62, having indicated thereon by mark or letter the same positions as are displayed on the circular wheel 5. When the lever is moved to any desired position, the shaft 9 will be rotated accordingly to select a corresponding gear in the manner hereinbefore described.

To illustrate the operation of our invention, we will employ the following specific example. It is desired, for instance, to select the third forward, or highest speed, which is indicated by the figure "3" on the circular wheel 5. Foot pressure is first applied to the foot pedal 47 to disengage any previously selected gear and throw out the clutch. The circular wheel 5 is then rotated until the figure "3" thereon is in a position opposite the finder 6ᵃ. Its correct position will be indicated when the notch of the disk 30ᵃ corresponding to the figure "3," is engaged by the pawl 32ᵃ. The rotation of the circular wheel 5 to this position will in turn rotate the shaft 9, by means of the bevel gears 7 and 8, to bring the fingers 33 carried by the said shaft into a position to grip the roller 28 of the shifting lever 26. The disk 55 will also be rotated sufficiently to bring the notch thereon corresponding to the said figure "3," into a position to be engaged by the arm 57. Pressure on the foot-pedal 47 is then gradually reduced, whereupon the roller 49, now in the vertical portion of the slot 50, will communicate the pressure exerted upon it by the arm 48, to the cam arm 51, which will in turn move the shaft 9 toward the housing 13. This longitudinal movement of the shaft 9 will shift the fingers 33 and roller 28, to move the lever 26 a sufficient extent to press the clutch member 21 into engagement with the clutch member 16. The driving shaft 14 will then be directly coupled to the transmission shaft 17, and locked in such position by the arm 57 carried by the clutch-pedal shaft 45, engaging the notch referred to on the disk 55. When the engagement of the said clutch members is complete, the roller 49 enters the radial portion of the slot 50, whereupon a further upward movement of the foot-pedal 47 will gradually permit the engagement of the clutch members 36 and 37 to connect the engine shaft 35 and transmission shaft 17, through the shaft 14, but impart no further movement to the shaft 9. The engine will now drive the car at its highest speed until the clutch members 36 and 37 are disengaged or the engine stopped.

Our invention is not limited to the details of construction and arrangement herein shown and described, but the character of the means employed may be varied to suit different conditions of use.

Having described our invention, we claim:

1. In a transmission mechanism, a shaft upon which are arranged different sets of selecting fingers for engagement with a plurality of gear-shifting devices, a manually-controlled member adapted to assume different positions, in operative connection with said shaft, said shaft adapted to be rotated in either direction by said member to present a certain set of fingers to a corresponding gear-shifting device, a foot-controlled member for imparting longitudinal movement to said shaft to shift the selected set of fingers and corresponding gear-shifting device, and locking means carried by said shaft, but having no longitudinal movement therewith, for rendering said gear-shifting devices inoperative except when engaged by the selecting fingers, substantially as described.

2. In a transmission mechanism, a shaft upon which are arranged different sets of selecting fingers in different radial planes, for engagement with a plurality of gear-shifting devices, a manually controlled member adapted to assume different positions, said shaft adapted to be rotated in either direction by said member to present a certain set of fingers to a corresponding gear-shifting device, a foot-controlled member for imparting longitudinal movement to said shaft to shift the selected set of fingers and corresponding gear-shifting device, a cylindrical housing carried by said shaft but having no longitudinal movement therewith, annular grooves provided in said housing in which said gear-shifting devices engage, one groove for each gear-shifting device, longitudinal slots provided in said housing, one for each set of selective fingers and through which said set of selective fingers and its corresponding gear-shifting device is movable when in engagement with each other, whereby, when the shaft is given longitudinal movement, said set of selective fingers and its corresponding gear-shifting device will be shifted through their corresponding slot in the cylindrical housing, while the other gear-shifting devices will be locked from movement through their engagement in their respective grooves in said housing to which no longitudinal movement is imparted, substantially as described.

3. In a transmission mechanism, a driving clutch, a spring adapted to hold the clutch members in engagement, a plurality of gear-shifting levers, a longitudinally-movable shaft adapted to shift a selected one of said gear-shifting levers, a cam arm carried by said shaft, said cam arm provided with a slot having a vertical portion and a portion radial with the shaft, a clutch-pedal shaft, and an arm mounted thereon carrying a roller adapted to move through said slot for the purpose of shifting the longitudinally-movable shaft and selected gear-shifting lever, without permitting the engagement of the clutch members, when traveling in the vertical portion of the slot, and permitting the spring to couple said clutch members, without imparting further movement to said shaft, when traveling in the radial portion of said slot, substantially as described.

4. In a transmission mechanism, a driving clutch, a spring adapted to hold the clutch members in engagement, a plurality of gear-shifting levers, a longitudinally movable shaft adapted to shift a selected one of said gear-shifting levers, a cam arm carried by said shaft, said cam arm provided with a slot having a vertical portion and a portion radial with the shaft, a clutch-pedal shaft, and an arm mounted thereon carrying a roller adapted to move through said slot for the purpose of effecting the uncoupling of the clutch members without shifting the longitudinally-movable shaft and selected gear-shifting lever, when traveling in the radial portion of the slot, and shifting said shaft and gear-shifting lever after entering the vertical portion of said slot, substantially as described.

5. In a transmission mechanism, a hand-controlled member adapted to assume different positions, a shaft upon which are arranged different sets of selecting fingers for engagement with a plurality of gear-shifting devices, said shaft adapted to be rotated by the hand-controlled member to present a certain set of fingers to a corresponding gear-shifting device, a disk carried by said shaft and having notches therein corresponding to the different positions of the hand-controlled member, and a clutch-pedal shaft carrying an arm adapted to engage the notches in said disk to lock a selected set of fingers and corresponding gear-shifting device in their selected position, substantially as described.

6. In a transmission mechanism, a driving clutch, a spring adapted to hold the clutch members in engagement, a hand-controlled disk mounted in front of the driver and adapted to be rotated to assume different positions, a shaft upon which are arranged different sets of selecting fingers for engagement with a plurality of gear-shifting levers, said shaft adapted to be rotated by the disk to present a certain set of fingers to a corresponding gear-shifting lever, a disk carried by said shaft having notches therein corresponding to the different positions of the hand-controlled disk, a clutch-pedal shaft operatively connected with the clutch members and first named shaft to uncouple the former and shift the latter, and an arm carried by the clutch-pedal shaft adapted to engage the notches on said disk to lock a selected set of fingers and corresponding gear-shifting lever in their selected position, the notches on said disk corresponding to the different gear-shifting levers being of sufficient depth to permit of a slight disengagement of the clutch members without shifting a selected set of fingers and corresponding gear-shifting lever, substantially as described.

7. In a transmission mechanism, a driving clutch, a spring adapted to hold the clutch members in engagement, a hand-controlled disk mounted in front of the driver and adapted to be rotated to assume different positions, a shaft upon which are arranged different sets of selecting fingers for engagement with a plurality of gear-shifting levers, said shaft adapted to be rotated by the disk to present a certain set of fingers to a corresponding gear-shifting lever, a disk carried by said shaft having notches therein corresponding to the different positions of the hand-controlled disk, a clutch pedal-shaft operatively connected with the clutch members and first named shaft to uncouple the former and shift the latter, and an arm carried by the clutch pedal shaft adapted to engage the notches in said disk to lock a selected set of fingers and corresponding gear-shifting lever in their selected position, the notches on said disk corresponding to the neutral position of the hand-controlled disk being of sufficient depth to lock the selected set of fingers and corresponding gear-shifting lever, but not of sufficient depth to permit the coupling of the driving clutch members by the spring, substantially as described.

In testimony whereof we have hereunto set our hands this 6th day of April, A. D. 1912.

JOHN C. LOCKYER.
JOHN P. FRANK.

Witnesses:
 HOWARD S. SMITH,
 BYRON B. HARLAN.